(12) United States Patent
Seo et al.

(10) Patent No.: US 12,456,775 B2
(45) Date of Patent: Oct. 28, 2025

(54) BATTERY PACK AND VEHICLE INCLUDING THE SAME

(71) Applicant: LG Energy Solution, Ltd., Seoul (KR)

(72) Inventors: Sung-Won Seo, Daejeon (KR); In-Je Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/690,956

(22) PCT Filed: Jul. 7, 2023

(86) PCT No.: PCT/KR2023/009697
§ 371 (c)(1),
(2) Date: Mar. 11, 2024

(87) PCT Pub. No.: WO2024/034870
PCT Pub. Date: Feb. 15, 2024

(65) Prior Publication Data
US 2024/0266660 A1 Aug. 8, 2024

(30) Foreign Application Priority Data

Aug. 10, 2022 (KR) .................. 10-2022-0099863

(51) Int. Cl.
*H01M 50/242* (2021.01)
*H01M 50/249* (2021.01)
(Continued)

(52) U.S. Cl.
CPC ....... *H01M 50/242* (2021.01); *H01M 50/264* (2021.01); *H01M 50/289* (2021.01); *H01M 50/204* (2021.01); *H01M 50/249* (2021.01)

(58) Field of Classification Search
CPC ............. H01M 50/242; H01M 50/289; H01M 50/264; H01M 50/249
See application file for complete search history.

(56) References Cited

U.S. PATENT DOCUMENTS

2008/0299453 A1 12/2008 Shinyashiki et al.
2015/0280183 A1 10/2015 Utley et al.
(Continued)

FOREIGN PATENT DOCUMENTS

CN 110800124 A 2/2020
CN 213459924 U 6/2021
(Continued)

OTHER PUBLICATIONS

International Search Report for Application No. PCT/KR2023/009697 mailed Oct. 12, 2023, pp. 1-3.
(Continued)

*Primary Examiner* — Jonathan G Jelsma
(74) *Attorney, Agent, or Firm* — Lerner David LLP

(57) ABSTRACT

A battery pack with a simplified structure and a vehicle including the same are provided. The battery pack according to an aspect of the present disclosure includes a plurality of battery cell assemblies, a pack housing configured to accommodate the plurality of battery cell assemblies therein, a plurality of support plates configured to support both sides of each battery cell assembly accommodated in the pack housing, and a fixing member configured to fix mutually adjacent support plates among the plurality of support plates to the pack housing so that a gap is formed between the mutually adjacent support plates.

7 Claims, 16 Drawing Sheets

(51) Int. Cl.
*H01M 50/264* (2021.01)
*H01M 50/289* (2021.01)
*H01M 50/204* (2021.01)

(56) References Cited

U.S. PATENT DOCUMENTS

| | | | |
|---|---|---|---|
| 2016/0268573 A1* | 9/2016 | Ishihara | H01M 50/209 |
| 2018/0097211 A1 | 4/2018 | Choi et al. | |
| 2019/0006646 A1 | 1/2019 | Lee et al. | |
| 2019/0267585 A1 | 8/2019 | Pellenc et al. | |
| 2020/0058912 A1* | 2/2020 | Kuramitsu | H01M 50/209 |
| 2020/0144570 A1 | 5/2020 | Ju et al. | |
| 2020/0220130 A1 | 7/2020 | Kume et al. | |
| 2020/0365844 A1 | 11/2020 | Jeon et al. | |
| 2020/0411816 A1 | 12/2020 | Yoneyama | |
| 2021/0057692 A1 | 2/2021 | Kim | |
| 2021/0175557 A1 | 6/2021 | Person et al. | |
| 2021/0194048 A1* | 6/2021 | Taniuchi | H01M 50/242 |
| 2021/0320358 A1* | 10/2021 | Lee | H01M 50/204 |
| 2022/0037714 A1 | 2/2022 | Lee | |
| 2022/0037726 A1 | 2/2022 | Choi et al. | |
| 2022/0115733 A1 | 4/2022 | Binder | |
| 2022/0158281 A1 | 5/2022 | Rhee et al. | |
| 2022/0355136 A1 | 11/2022 | Lee et al. | |
| 2022/0393290 A1 | 12/2022 | Seo et al. | |
| 2023/0052417 A1 | 2/2023 | Shin et al. | |
| 2023/0282919 A1 | 9/2023 | Park et al. | |

FOREIGN PATENT DOCUMENTS

| | | | |
|---|---|---|---|
| CN | 214898766 U | 11/2021 | |
| CN | 113745725 A | 12/2021 | |
| CN | 114552110 A | 5/2022 | |
| JP | 2008300288 A | 12/2008 | |
| JP | 2012009311 A | 1/2012 | |
| JP | 2015211013 A | 11/2015 | |
| JP | 2019514177 A | 5/2019 | |
| JP | 2019532482 A | 11/2019 | |
| JP | 2020522104 A | 7/2020 | |
| JP | WO2019031175 A1 | 7/2020 | |
| JP | WO2019039260 A1 | 8/2020 | |
| JP | 2021096974 A | 6/2021 | |
| KR | 101815154 B1 | 1/2018 | |
| KR | 20180050086 A | 5/2018 | |
| KR | 20190049797 A | 5/2019 | |
| KR | 20200106378 A | 9/2020 | |
| KR | 20200131500 A | 11/2020 | |
| KR | 20210023066 A | 3/2021 | |
| KR | 102241965 B1 | 4/2021 | |
| KR | 20210122559 A | 10/2021 | |
| KR | 20220012038 A | 2/2022 | |
| KR | 20220014027 A | 2/2022 | |
| KR | 20220017741 A | 2/2022 | |
| KR | 20220065548 A | 5/2022 | |
| WO | 2018061894 A1 | 4/2018 | |
| WO | 2021145605 A1 | 7/2021 | |

OTHER PUBLICATIONS

Extended European Search Report including Written Opinion for Application No. 23848579.1, dated Nov. 13, 2024. 7 pgs.

\* cited by examiner

BATTERY PACK AND VEHICLE INCLUDING THE SAME

CROSS-REFERENCE TO RELATED APPLICATIONS

The present application is a national phase entry under 35 U.S.C. § 371 of International Application No. PCT/KR2023/009697 filed on Jul. 7, 2023, which claims priority to Korean Patent Application No. 10-2022-0099863 filed on Aug. 10, 2022, in the Republic of Korea, the disclosures of which are incorporated herein by reference.

TECHNICAL FIELD

The present disclosure relates to a battery pack and a vehicle including the same, and more particularly, to a battery pack with a simplified structure and a vehicle including the same.

BACKGROUND ART

As the demand for portable electronic products such as laptops, video cameras, and mobile phones has rapidly increased in recent years and the development of electric vehicles, energy storage batteries, robots, and satellites has begun in earnest, research on high-performance secondary batteries capable of repeated charge/discharge has been actively conducted.

Currently commercialized secondary batteries include nickel cadmium batteries, nickel hydride batteries, nickel zinc batteries, and lithium secondary batteries. Among them, lithium secondary batteries are in the spotlight because they have almost no memory effect compared to nickel-based secondary batteries, and thus have advantages of free charge/discharge, very low self-discharge rate, and high energy density.

A lithium secondary battery mainly uses a lithium-based oxide and a carbon material as a positive electrode active material and a negative electrode active material, respectively. In addition, the lithium secondary battery includes an electrode assembly in which a positive electrode plate and a negative electrode plate coated with the positive electrode active material and the negative electrode active material, respectively are disposed with a separator interposed therebetween, and a casing for sealing and accommodating the electrode assembly along with an electrolyte.

Meanwhile, depending on the shape of the battery case, lithium secondary batteries may be classified into a can-type secondary battery in which an electrode assembly is embedded in a metal can, and a pouch-type secondary battery in which an electrode assembly is embedded in a pouch of an aluminum laminate sheet. In addition, the can-type secondary battery can be further classified into a cylindrical battery and a prismatic battery according to the shape of the metal can.

Here, the pouch of the pouch-type secondary battery can be largely classified into a lower sheet and an upper sheet covering it. At this time, an electrode assembly formed by stacking and winding a positive electrode, a negative electrode, and a separator is stored in the pouch. In addition, after receiving the electrode assembly, the edges of the upper sheet and the lower sheet are sealed by thermal fusion or the like. In addition, an electrode tab drawn out from each electrode may be coupled to an electrode lead, and an insulating film may be added to a portion of the electrode lead in contact with the sealing portion.

In this way, the pouch-type secondary battery can have the flexibility to be configured in various forms. In addition, the pouch-type secondary battery has the advantage of being able to implement a secondary battery of the same capacity with a smaller volume and mass.

The lithium secondary batteries are used to construct a battery module or a battery pack by stacking a plurality of battery cells themselves or in a cartridge to form a densely packed structure and electrically connecting them to provide high voltage and high current.

However, such a conventional battery pack may be disadvantageous in terms of energy density. Typically, in the process of modularizing multiple battery cells by storing them inside a module case, the volume of the battery pack may increase unnecessarily or the space occupied by the battery cells may decrease due to various components such as the module case or stacking frame. Furthermore, the space occupied by the components themselves, such as the module case or stacking frame, as well as the storage space of the battery cells may be reduced to ensure assembly tolerances for these components. Therefore, in the case of conventional battery packs, there may be limitations in increasing energy density.

Additionally, in the case of a conventional battery pack, it may be disadvantageous in terms of assembly. In particular, in order to manufacture a battery pack, a number of battery cells are first modularized to form a battery module, and then the battery module is stored in a pack case. Therefore, the manufacturing process of the battery pack becomes complicated. Moreover, the process and structure of forming a cell stack using the above-described stacking frame, bolts, plates, etc. may be very complicated.

Additionally, in the case of a conventional battery pack, since the module case is stored inside the pack case and the battery cells are stored inside the module case, there is a problem that it is difficult to secure excellent cooling properties. In particular, when heat from the battery cells stored inside the module case is discharged to the outside of the pack case through the module case, cooling efficiency may decrease and the cooling structure may become complicated.

In addition, in the battery pack, typically, one of the important issues is safety. In particular, when a thermal event occurs in any of the battery cells included in the battery pack, it is necessary to suppress the propagation of the event to the other battery cell.

Unless thermal propagation between the battery cells is properly suppressed, the thermal event may spread to the other battery cell included in the battery pack, causing a greater problem such as a fire or explosion in the battery pack. Moreover, the fire or explosion in the battery pack may cause human and economic loss and damage. Accordingly, the battery pack needs a configuration for properly controlling the thermal event.

DISCLOSURE

Technical Problem

The present disclosure is designed to solve the problems of the related art, and therefore the present disclosure is directed to providing a battery pack with a simplified structure and a vehicle including the same.

However, the technical problem to be solved by the present disclosure is not limited to the above-mentioned problem, and other problems not mentioned will be clearly understood by those skilled in the art from the present disclosure described below.

Technical Solution

A battery pack according to one aspect of the present disclosure comprises a plurality of battery cell assemblies; a pack housing configured to accommodate the plurality of battery cell assemblies therein; a plurality of support plates configured to support both sides of each battery cell assembly accommodated in the pack housing; and a fixing member configured to fix mutually adjacent support plates among the plurality of support plates to the pack housing so that a gap is formed between the mutually adjacent support plates.

In an embodiment, the fixing member may include a gap forming portion configured to be inserted between the mutually adjacent support plates to form the gap.

In an embodiment, the size of the gap may be configured to correspond to the thickness of the gap forming portion.

In an embodiment, the battery pack may further comprise a guide member disposed between the mutually adjacent support plates and configured to guide insertion of the gap forming portion.

In an embodiment, the fixing member may be provided at one end of the mutually adjacent support plates and the other end of the mutually adjacent support plates located at the opposite side of the one end, respectively.

In an embodiment, at least one of the fixing members provided at the one end and the other end of the mutually adjacent support plates may be configured integrally with the pack housing.

In an embodiment, at least one of the mutually adjacent support plates may include an indented portion into which a portion of the fixing member is inserted and coupled.

In an embodiment, the fixing member may further include a side portion configured to extend from one side of the gap forming portion toward the at least one support plate and inserted into the indented portion of the at least one support plate.

In an embodiment, the side portion may be configured to be in close contact with an inner surface of the indented portion.

In an embodiment, the fixing member may further include a pair of side portions configured to extend from both sides of the gap forming portion toward an adjacent support plate with the gap forming portion interposed therebetween, and to be inserted into the indented portion of the adjacent support plate.

In an embodiment, the battery pack may further comprise a compression pad disposed between each of the battery cell assemblies and the support plate that support the corresponding battery cell assembly among the plurality of support plates.

In addition, a vehicle according to sill another aspect of the present disclosure comprises at least one battery pack according to any one of the above embodiments.

Advantageous Effects

According to an embodiment of the present disclosure, since reinforcing members such as module cases or pack cross beams are not required, the space occupied by the module case or the reinforcing members within the pack housing or the space required to secure tolerances may not be required. Accordingly, it is possible to secure additional space within the pack housing for mounting the battery cell assembly, thereby improving the energy density of the battery pack.

In addition, according to an embodiment of the present disclosure, since the support plate supporting the front and rear surfaces of the battery cell assembly can be directly fixed to the pack housing through the fixing member, without the need for a separate reinforcing member such as a pack cross beam, the arrangement state of the battery cell assembly within the pack housing can be maintained stably.

In addition, according to an embodiment of the present disclosure, the swelling phenomenon that may occur in the battery cell assembly can be effectively controlled through the gap between the support plates.

In addition, according to an embodiment of the present disclosure, the gap between support plates can prevent or minimize thermal runaway or flame propagation between adjacent battery cell assemblies when an event such as thermal runaway occurs in a specific battery cell assembly. Accordingly, thermal runaway propagation and simultaneous ignition between multiple battery cell assemblies can be prevented or minimized.

In addition, according to an embodiment of the present disclosure, since reinforcing members such as a module case or pack cross beam are not required, the volume and weight of the battery pack can be reduced and the manufacturing process can be simplified.

In addition, various additional effects can be achieved by various embodiments of the present disclosure. Various effects of the present disclosure will be described in detail in each embodiment, or descriptions of effects that can be easily understood by those skilled in the art will be omitted.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
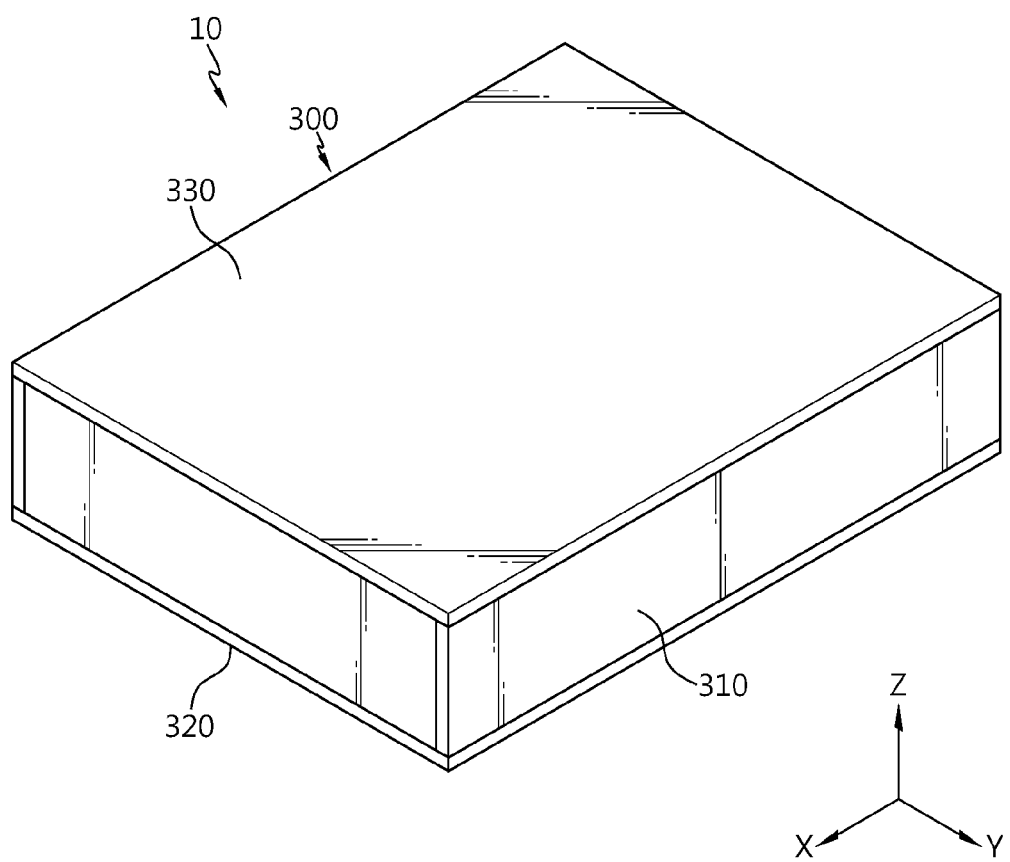
FIG. 1 is a diagram showing a battery pack according to an embodiment of the present disclosure.
Figure 2:
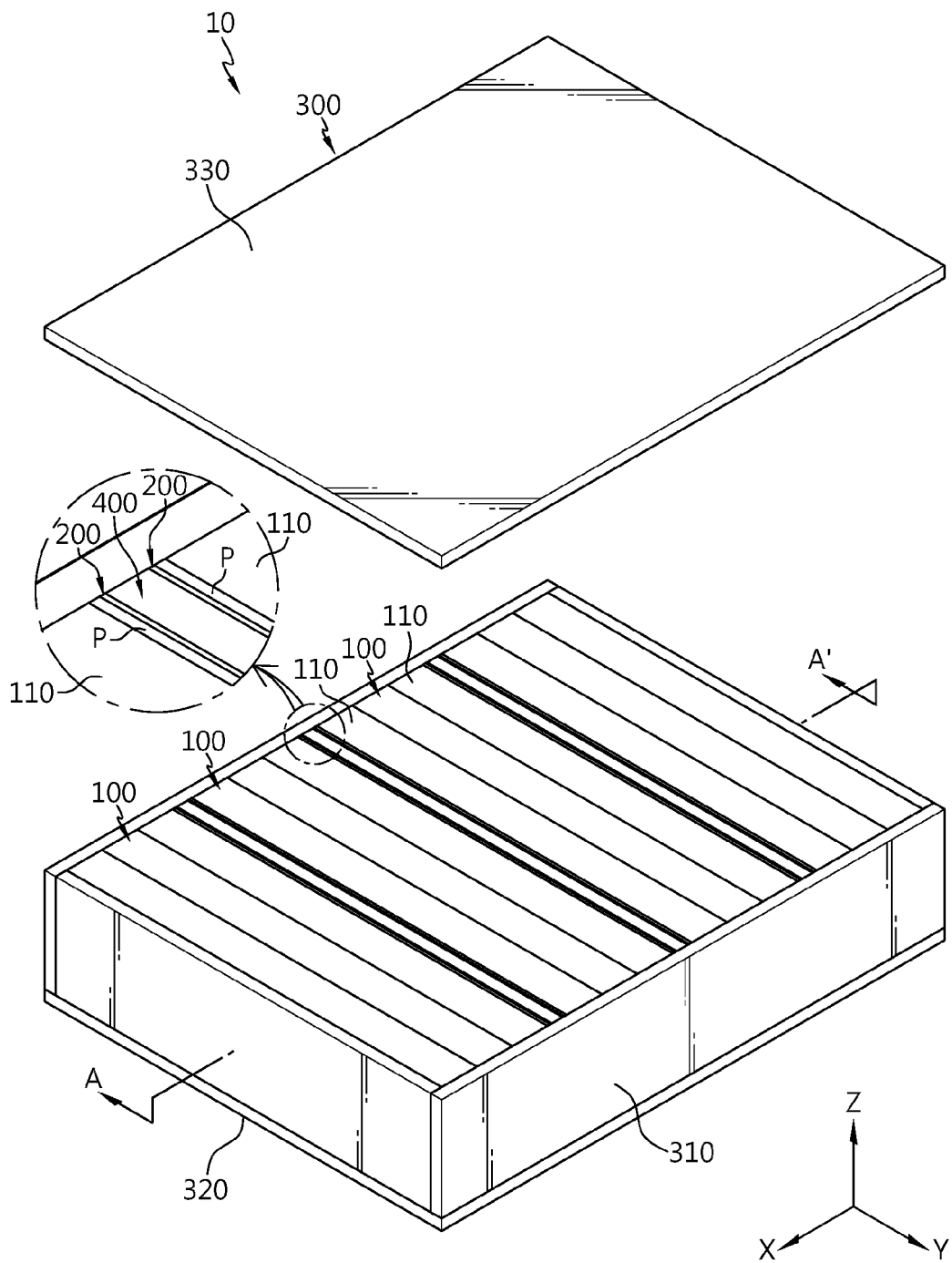
FIG. 2 is a drawing to explain the detailed structure of the battery pack of FIG. 1.
Figure 3:
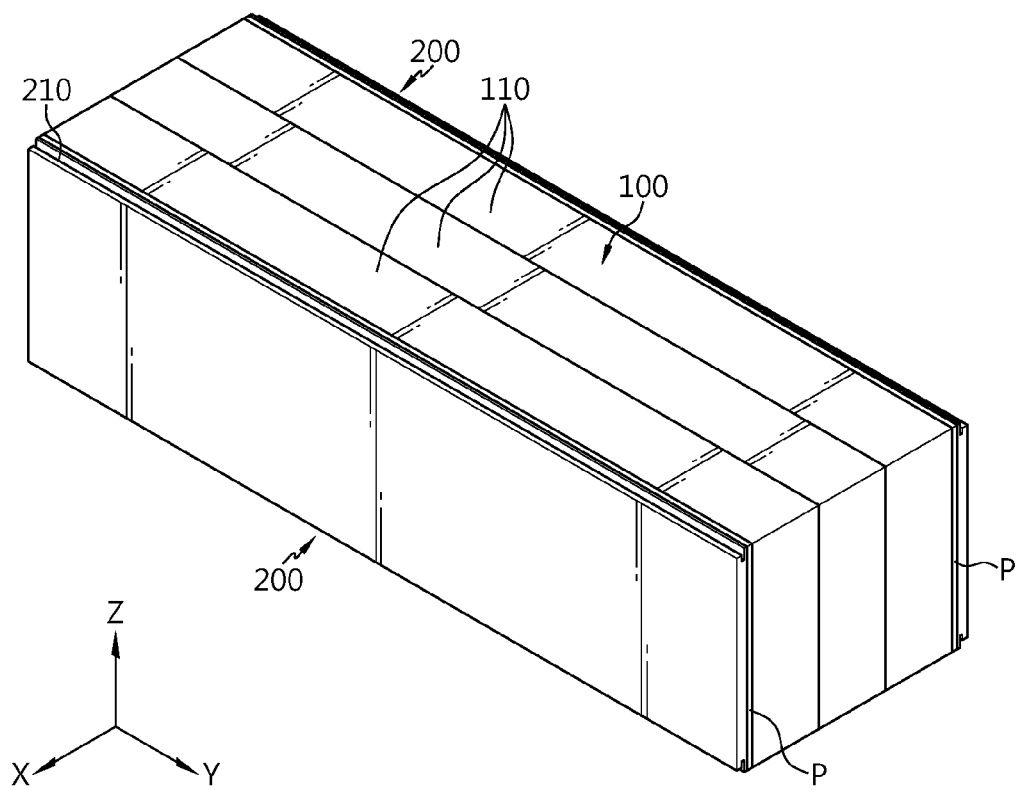
FIG. 3 is a diagram showing a battery cell assembly and a support plate provided in the battery pack of FIG. 1.

FIG. 1 is a diagram showing a battery pack 10 according to an embodiment of the present disclosure, FIG. 2 is a drawing to explain the detailed structure of the battery pack 10 of FIG. 1, and FIG. 3 is a diagram showing a battery cell assembly 100 and a support plate 200 provided in the battery pack 10 of FIG. 1.

In embodiments of the present disclosure, the X-axis direction shown in the drawings may mean front and rear directions of the battery pack 10, which will be described later, the Y-axis direction may mean left and right directions of the battery pack 10 perpendicular to the X-axis direction on the horizontal plane (XY plane), and the Z-axis direction may mean upper and lower directions perpendicular to both the X-axis direction and the Y-axis direction.

Referring to FIGS. 1 to 3, the battery pack 10 according to an embodiment of the present disclosure may include a battery cell assembly 100, a support plate 200, a pack housing 300, and a fixing member 400.

The battery cell assembly 100 includes at least one battery cell 110. For example, as shown in FIG. 2, the battery cell assembly 100 may include a plurality of battery cells 110 stacked in one direction (X-axis direction). Here, the battery cell may refer to the most basic secondary battery capable of charging and discharging. This battery cell 110 may be composed of a pouch-type battery cell, a cylindrical battery cell, or a prismatic battery cell. As an example, the battery cell 110 may be a pouch-type battery cell. Although not shown in detail, electrode leads may be provided on at least one of both sides of the battery cell 110.

The battery pack 10 according to the present disclosure may include a plurality of battery cell assemblies 100 described above. In this case, the plurality of battery cell assemblies 100 may be arranged side by side along one direction (X-axis direction).

The support plate 200 is disposed at both ends of the stacking direction (X-axis direction) of each battery cell assembly 100 accommodated in the pack housing 300, which will be described later, and is configured to support both sides of the corresponding battery cell assembly 100. This support plate 200 may be made of a material with strong heat resistance and rigidity.

The pack housing 300 is configured to accommodate the battery cell assembly 100 therein. To this end, the pack housing 300 may include an internal accommodating space for accommodating the battery cell assembly 100. Additionally, the pack housing 300 may be made of a material with strong heat resistance and rigidity.

This pack housing 300 may be configured as one piece, or may be configured as an assembly assembled by combining a plurality of members. In one embodiment, the pack housing 300 may be composed of multiple frames that are coupled to each other. In other words, the pack housing 300 may be composed of multiple frames that are combined with each other to form an internal accommodation space of a predetermined size.

Specifically, the pack housing 300 may include a side frame 310, a floor frame 320, and an upper cover 330.

The side frame 310 may configure the side of the pack housing 300. As an example, the side frame 310 may configure the side of the pack housing 300 in the front and rear directions (X-axis direction) and the side of the pack housing 300 in the left and right directions (Y-axis direction).

The floor frame 320 constitutes the lower part of the pack housing 300 and may be coupled to the lower part of the side frame 310. At this time, the floor frame 320 may be equipped with a built-in heat sink (not shown).

The upper cover 330 is coupled to the upper part of the side frame 310 and may cover the upper side of the battery cell assembly 100 accommodated inside the pack housing 300. At this time, a heat transfer material (not shown) may be provided on the lower part of the upper cover 330.

The fixing member 400 is configured to fix mutually adjacent support plates, among the plurality of support plates 200 supporting the plurality of battery cell assemblies 100, to the pack housing 300, so that a gap (S, see FIG. 6 described later) is formed between the mutually adjacent support plates. In this case, the gap S formed by the fixing member 400 may serve as a buffer space between the mutually adjacent support plates. Additionally, the fixing member 400 may be configured to extend in the left and right directions (Y-axis direction) of the pack housing 300. In an embodiment, the fixing member 400 may include an elastic material.

Meanwhile, the fixing member 400 may be configured to directly fix the support plate 200, which supports the front and rear sides of the battery cell assembly 100, to the pack housing 300. As an example, the fixing member 400 may fix the support plate 200 by pressing the support plate 200 toward the pack housing 300 in the upper and lower directions (see FIGS. 7 and 8, described later). For example, the fixing member 400 may fix the support plate 200 by pressing the support plate 200 toward the floor frame 320 and/or the upper cover 330 of the pack housing 300 described above.

At this time, the lower part of the battery cell assembly 100 may be located adjacent to the floor frame 320. Alternatively, the upper part of the battery cell assembly 100 may be located adjacent to the upper cover 330. Alternatively, the lower part of the battery cell assembly 100 may be located adjacent to the floor frame 320, and the upper part of the battery cell assembly 100 may be located adjacent to the upper cover 330. As another example, the lower part of the battery cell assembly 100 may be in close contact with the floor frame 320. Alternatively, the upper part of the battery cell assembly 100 may be in close contact with the upper cover 330. Alternatively, the lower part of the battery cell assembly 100 may be in close contact with the floor frame 320, and the upper part of the battery cell assembly 100 may be in close contact with the upper cover 330. Accordingly, heat generated from the battery cell assembly 100 may be discharged to the outside of the pack housing 300 through the heat sink provided in the floor frame 320 and/or the heat transfer material provided in the upper cover 330.

According to this embodiment of the present disclosure, since reinforcing members such as module cases or pack cross beams are not required, the space occupied by the module case or reinforcing members within the pack housing 300 or the space for securing tolerances may not be required. Accordingly, it is possible to secure additional space within the pack housing 300 for mounting the battery cell assembly 100, so the energy density of the battery pack 10 can be further improved.

In addition, according to the embodiment of the present disclosure, since the support plate 200 supporting the front and rear sides of the battery cell assembly 100 may be directly fixed to the pack housing 300 through the fixing member 400, without the need for a separate reinforcing member such as a pack cross beam, the arrangement of the battery cell assembly 100 within the pack housing 300 can be maintained stably.

In addition, according to the embodiment of the present disclosure, swelling phenomenon that may occur in the battery cell 110 included in the battery cell assembly 100 can be effectively controlled through the gap S between the support plates 200.

In addition, according to the embodiment of the present disclosure, when an event such as thermal runaway phenomenon occurs in a specific battery cell assembly 100, it is possible to prevent or minimize thermal runaway or flame from propagating between adjacent battery cell assemblies 100 through the gap S between the support plates 200. Accordingly, it is possible to prevent or minimize thermal runaway propagation and simultaneous ignition between multiple battery cell assemblies 100.

Additionally, according to the embodiment of the present disclosure, since reinforcing members such as a module case or pack crossbeam are not required, the volume and weight of the battery pack can be reduced and the manufacturing process can be simplified.

Figure 4:
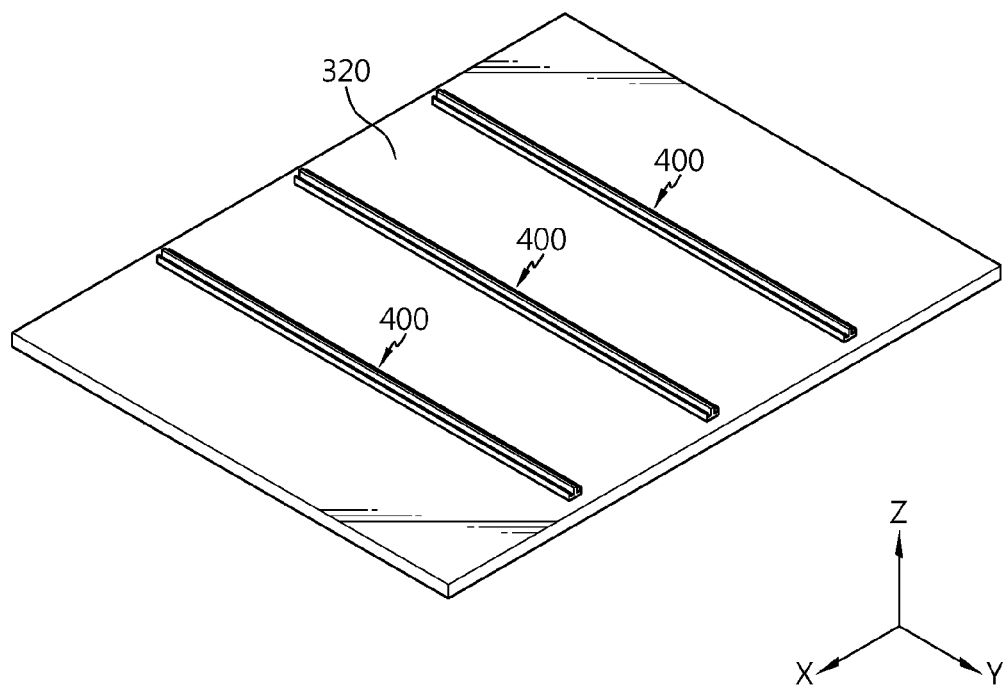
FIG. 4 is a diagram showing a part of the pack housing provided in the battery pack of FIG. 1.
Figure 5:
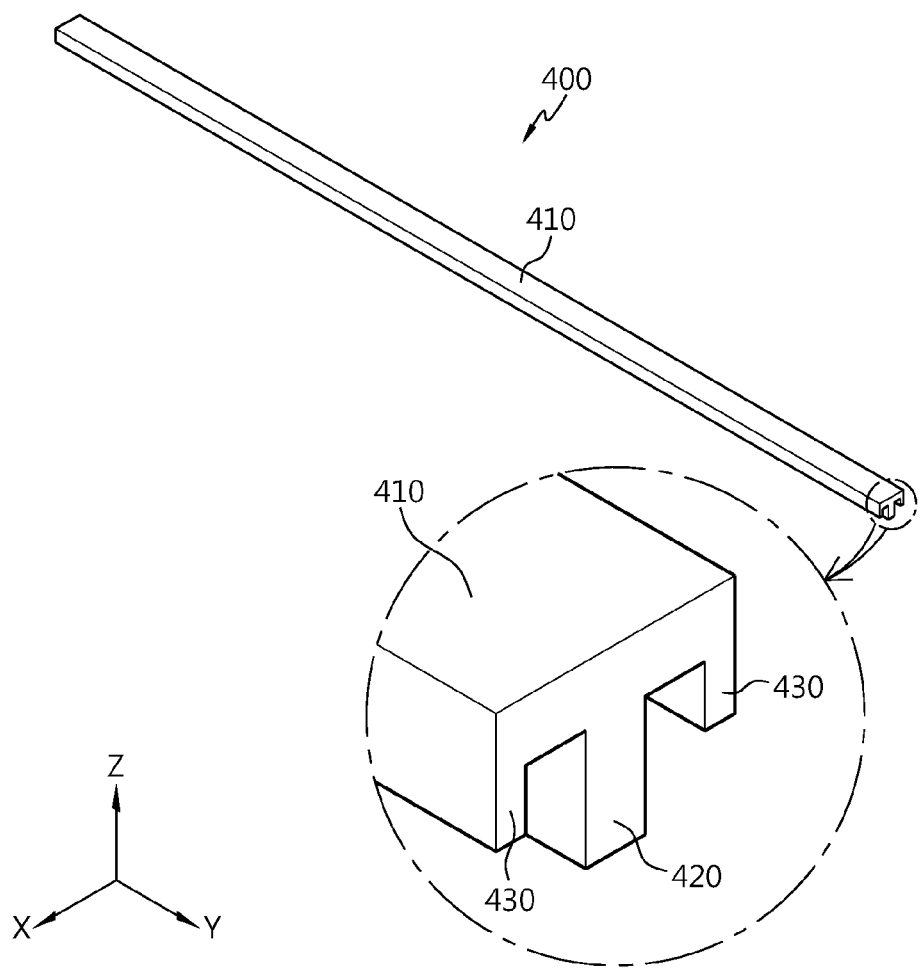
FIG. 5 is a diagram showing a fixing member provided in the battery pack of FIG. 1.
Figure 6:
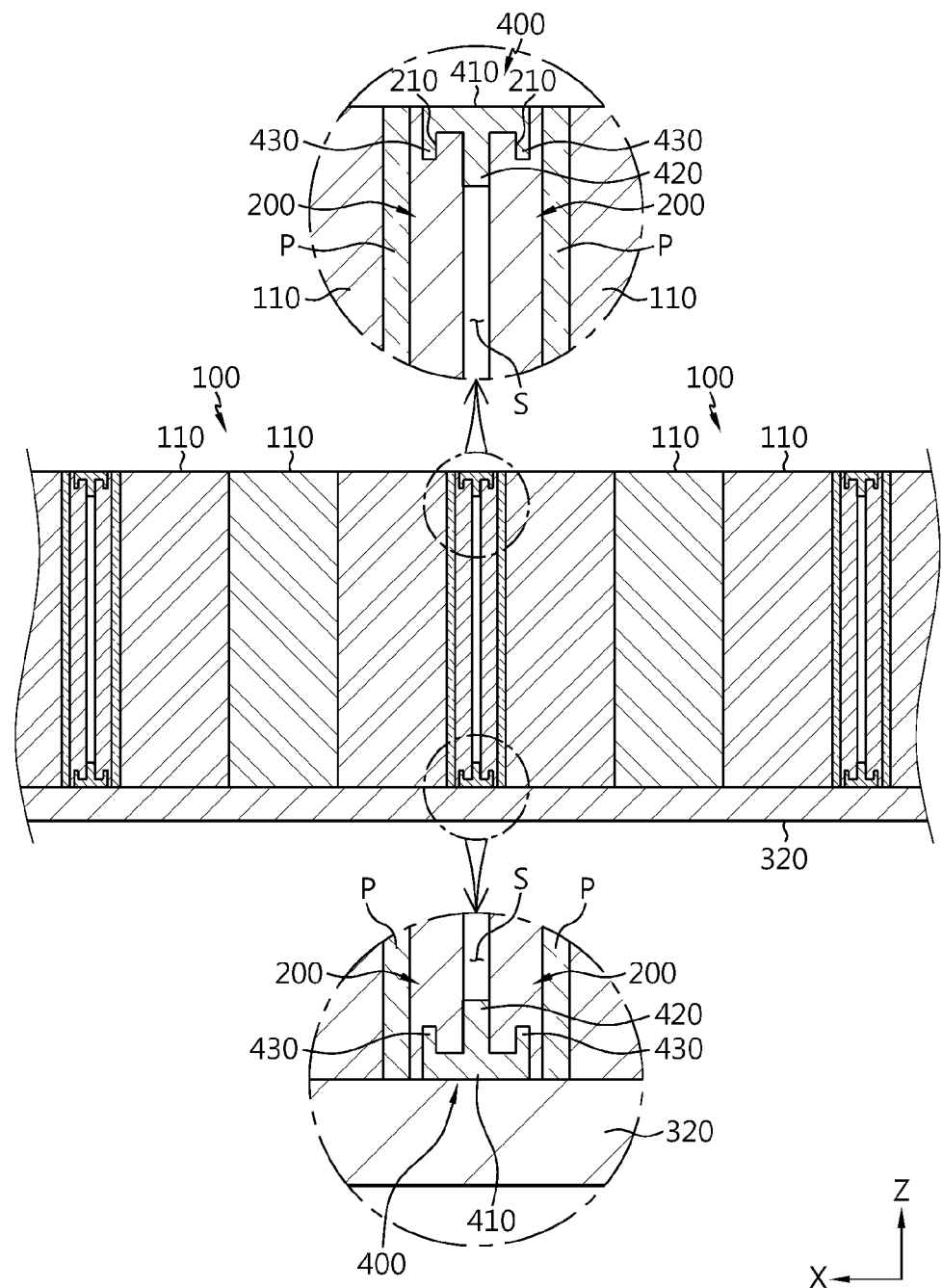
FIG. 6 is a cross-sectional view in the direction A-A' of FIG. 2.

FIG. 4 is a diagram showing a part of the pack housing 300 provided in the battery pack 10 of FIG. 1, FIG. 5 is a diagram showing a fixing member 400 provided in the battery pack 10 of FIG. 1, and FIG. 6 is a cross-sectional view in the direction A-A' of FIG. 2 (in detail, FIG. 6 is a cross-sectional view showing the configuration of FIG. 2 with respect to the XZ plane based on line A-A').

Referring to FIGS. 2 and 4 to 6, the fixing member 400 may include a body 410 and a gap forming portion 420.

The body 410 corresponds to the main body of the fixing member 400 and may have a length corresponding to the length of the support plate 200.

The gap forming portion 420 may be inserted in the upper and lower directions between mutually adjacent support plates among the plurality of support plates 200 supporting the plurality of battery cell assemblies 100, and may be configured to form the gap S described above. At this time, in the fixing member 400, the gap forming portion 420 may protrudes from the center portion of the body 410 and have a generally "T-shaped" cross section. Additionally, the gap forming portion 420 may have a predetermined thickness and protrude from the center portion of the body 410 by a predetermined length.

That is, when the support plates 200 supporting the battery cell assemblies 100 are fixed within the pack housing 300, the gap forming portion 420 of the fixing member 400 may be inserted between the support plates 200 in the upper and lower directions to form the gap S. In this case, the size of the gap S may be configured to correspond to the thickness of the gap forming portion 420.

Additionally, when the gap forming portion 420 is inserted between the support plates 200 in the upper and lower directions, the body 410 of the fixing member 400 may cover and airtightly seal the top or bottom of the gap S.

According to this embodiment, the buffer space between the support plates 200 supporting different adjacent battery cell assemblies 100 may be formed more easily and stably.

Figure 7:
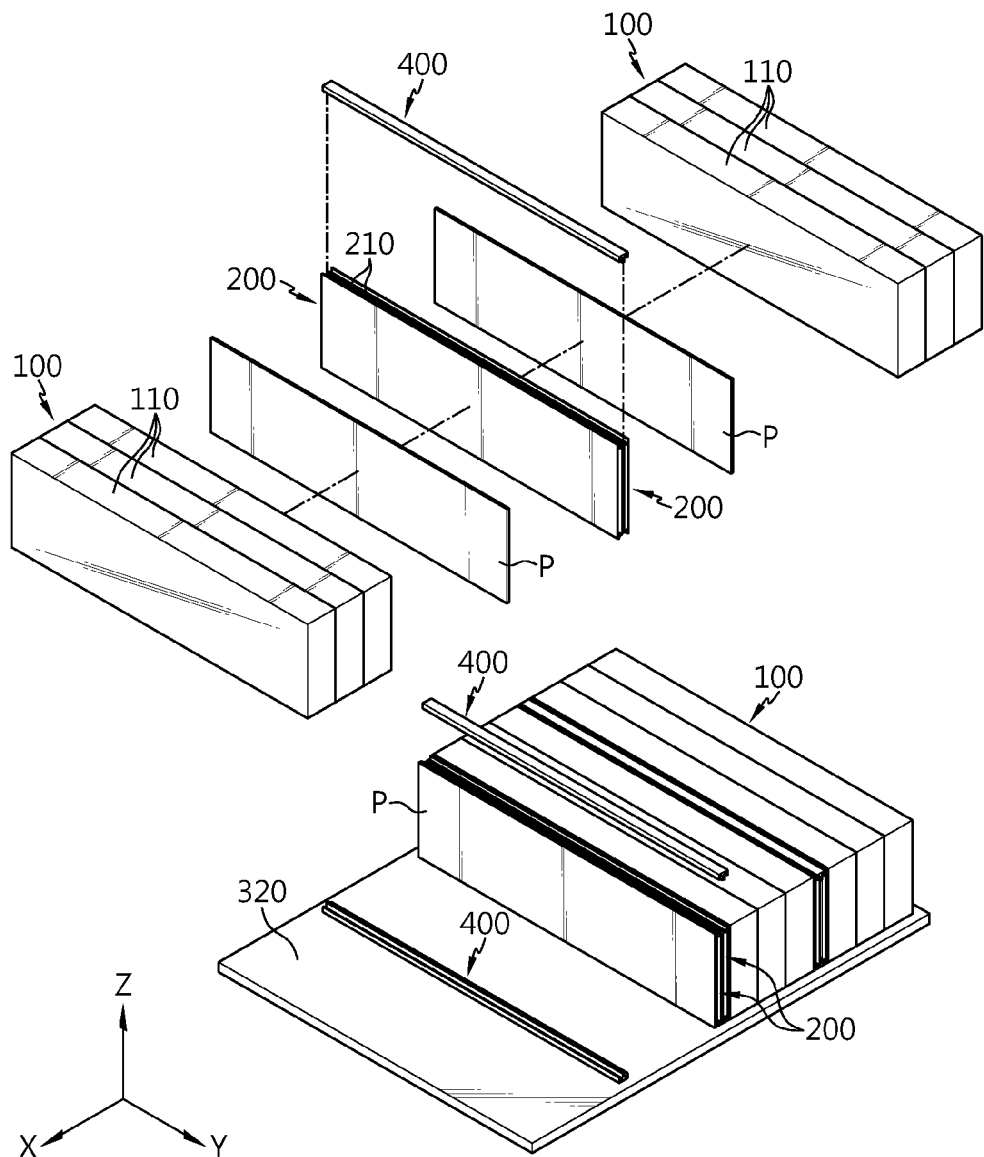
FIGS. 7 and 8 are diagrams showing the state in which the battery cell assembly and the support plate are assembled in the pack housing of FIG. 4.
Figure 8:
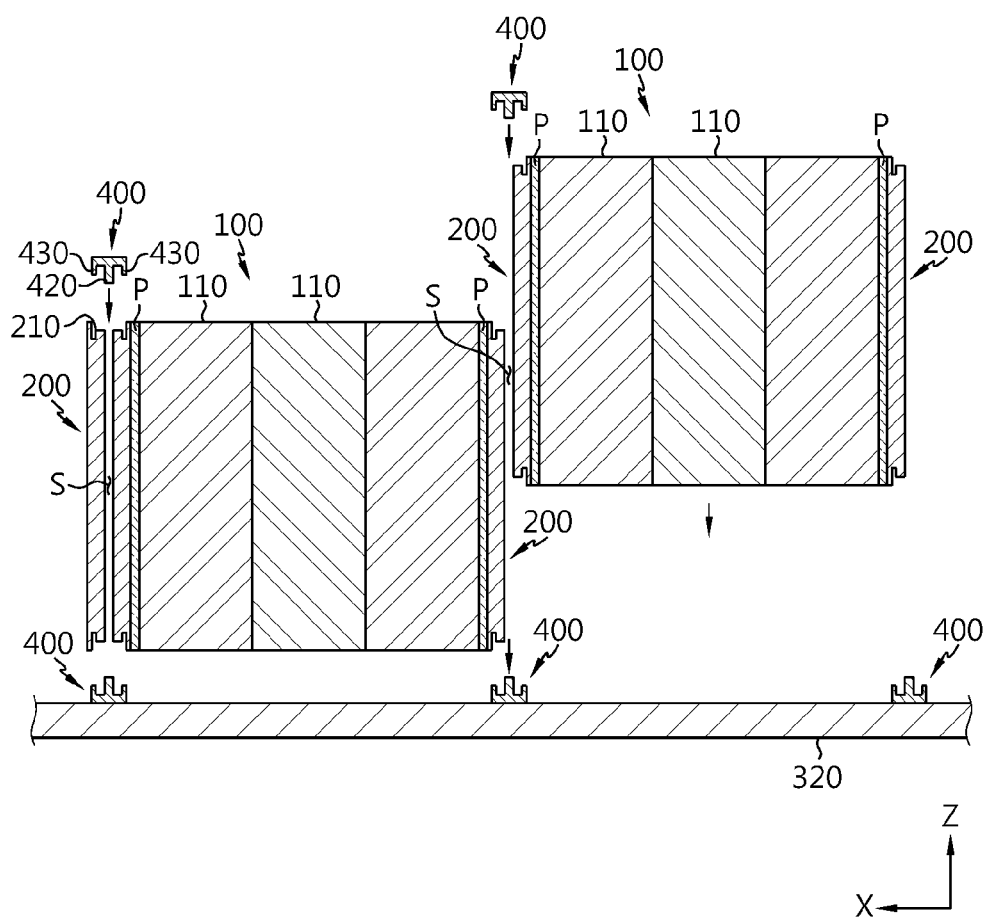

FIGS. 7 and 8 are diagrams showing the state in which the battery cell assembly 100 and the support plate 200 are assembled in the pack housing 300 of FIG. 4. At this time, the side frame 310 and the upper cover 330 of the pack housing 300 are omitted in FIG. 7.

Referring to FIGS. 6 to 8, the battery pack 10 may include a plurality of fixing members 400. That is, the fixing member 400 may be provided at one end of the mutually adjacent support plates and the other end of the mutually adjacent support plates located at the opposite side of the one end. In an embodiment, the battery pack 10 may include a pair of fixing members 400 facing each other in the upper and lower directions as a unit, and may include a plurality of such pairs of fixing members. In this case, the gap forming portions of the pair of fixing members 400 may be inserted between the mutually adjacent support plates, respectively, and may be inserted into the upper and lower sides of the support plates 200 to form the gap S.

For example, among the pair of fixing members 400 that fix the two support plates 200, which respectively support the corresponding battery cell assemblies between different adjacent battery cell assemblies, to the pack housing 300, the gap forming portion 420 of the first fixing member 400 may be inserted upward at the lower end of the two support plates 200, and the gap forming portion 420 of the second fixing member 400 may be inserted downward at the upper end of the two support plates 200. At this time, the bodies 410 of the pair of fixing members 400 may airtightly seal the lower and upper ends of the gap S, respectively.

According to this embodiment, the buffer space between the support plates 200 supporting different adjacent battery cell assemblies 100 can be formed more easily and stably.

Referring to FIGS. 2 and 6 to 8, at least one of the pair of fixing members 400 provided at the upper and lower ends of two mutually adjacent support plates 200 may be formed integrally with the pack housing 300.

In an embodiment, one of the pair of fixing members 400 may be integrated with the floor frame 320 of the pack housing 300 described above. In another embodiment, one of the pair of fixing members 400 may be integrated with the upper cover 330 of the pack housing 300 described above. In another embodiment, one of the pair of fixing members 400 may be integrally configured with the floor frame 320, and the other may be integrally configured with the upper cover 330.

According to this embodiment, the buffer space between the support plates 200 supporting different adjacent battery cell assemblies 100 can be more easily and stably formed, and the support plate 200 can be more stably fixed to the pack housing 300.

Referring to FIGS. 6 to 8, at least one support plate 200 of the mutually adjacent support plates may include an indented portion 210 into which a portion of the fixing member 400 is inserted and coupled.

The indented portion 210 may be configured such that one end of the fixing member 400 is inserted and coupled in the upper and lower directions. Specifically, one end of the body 410 of the fixing member 400 may be inserted and coupled in the indented portion 210 in the upper and lower directions. To this end, the indented portion 210 may have a groove structure indented to a certain depth from the upper or lower end of the support plate 200 standing in the upper and lower directions toward the center of the support plate 200.

That is, when the support plates 200 supporting the battery cell assembly 100 are fixed within the pack housing 300, the indented portion 210 may provide an additional buffer space in addition to the gap S described above. Specifically, an empty space may be formed in the portion corresponding to the indented portion 210 in the support plate 200, and the side portion of the body 410 of the fixing member 400 may be coupled to this indented portion 210, so the indented portion 210 can provide an additional buffer space to respond to the swelling phenomenon of the battery cell assembly 100.

According to this embodiment, swelling phenomenon that may occur in the battery cell assembly 100 can be more effectively controlled.

Referring again to FIGS. 5 to 8, the fixing member 400 may include a side portion 430 that extends from one side of the gap forming portion 420 toward the at least one support plate 200 and is inserted into the indented portion 210 of the at least one support plate 200. In this case, the side portion 430 may be configured to be in close contact with the inner surface of the indented portion 210.

In an embodiment, the fixing member 400 may include a pair of side portions 430. In this case, the pair of side portions 430 may be configured to extend from both sides of the gap forming portion 420 toward the adjacent support plate 200, with the gap forming portion 420 interposed therebetween, and to be inserted into the indented portion 210 of the adjacent support plate 200.

This pair of side portions 430 may correspond to both ends of the body 410 described above. Specifically, the pair of side portions 430 may be provided on both sides of the gap forming portion 420 with the gap forming portion 420 interposed therebetween. In this case, the pair of side portions 430 may be configured to protrude from both ends of the body 410.

Additionally, each side portion 430 may be configured to be inserted and coupled into the indented portion 210 of the support plate 200 that supports the adjacent battery cell assembly 100.

Accordingly, when the support plates 200 supporting the battery cell assembly 100 are fixed within the pack housing 300, the fixing member 400 and the support plate 200 can be coupled stably to each other. That is, since the pair of side portions 430 protruding from both sides of the body 410 are coupled to the support plates 200, the gap forming portion 420 protruding from approximately the center of the body 410 may stably form the gap S between the support plates 200.

According to this embodiment, the buffer space between the support plates supporting different adjacent battery cell assemblies can be formed more easily and stably.

Referring to FIGS. 6 to 8, the side portion 430 may be configured to come into close contact with the inner surface of the indented portion 210 in the upper and lower directions. That is, the side portion 430 may be inserted into the indented portion 210 and may be configured to come into close contact with the inner surface of the indented portion 210.

In this way, with the gap S formed between the support plates 200 by the gap forming portion 420, the pair of side portions 430 may be respectively inserted into the indented portions of the support plates located on both sides of the gap forming portion 420 to come into close contact with the inner surface of the indented portion 210, thereby sealing the upper and/or lower sides of the gap S more airtightly.

According to this embodiment, the buffer space between the support plates 200 supporting different adjacent battery cell assemblies 100 can be formed more easily and stably.

Referring to FIG. 6, the battery pack 10 may further include a compression pad P. The compression pad P may be configured to be disposed between the battery cell assembly 100 and the support plate 200 that supports the battery cell assembly 100. In an embodiment, the compression pad P may include a material having elasticity, such as sponge, urethane, or silicone. In addition, the compression pad P may include insulating material.

The compression pad P may be disposed between at least one of the front and rear surfaces of the battery cell assembly 100 and the support plate 200 when viewed from the stacking direction (X-axis direction) of the plurality of battery cells 110. As an example, the compression pad P may be configured to suppress swelling phenomenon that may occur in the battery cell assembly 100.

As described above, according to the present disclosure, swelling phenomenon that may occur in the battery cell assembly 100 can be effectively controlled through the gap S between the support plates 200 formed by the fixing member 400.

In addition, since the compression pad P to prevent swelling phenomenon of the battery cell assembly 100 is placed between at least one of the front and rear sides of the battery cell assembly 100 and the support plate 200, the quantity of the compression pad P is minimized, thereby simplifying parts of the battery pack 10. Accordingly, additional space for accommodating the battery cell assembly 100 can be secured in the limited internal space of the pack housing 300, so the energy density of the battery pack 10 can be further improved.

Meanwhile, the compression pad P is not necessarily limited to the above-described embodiment, and may also be disposed between mutually adjacent battery cells.

Figure 9:
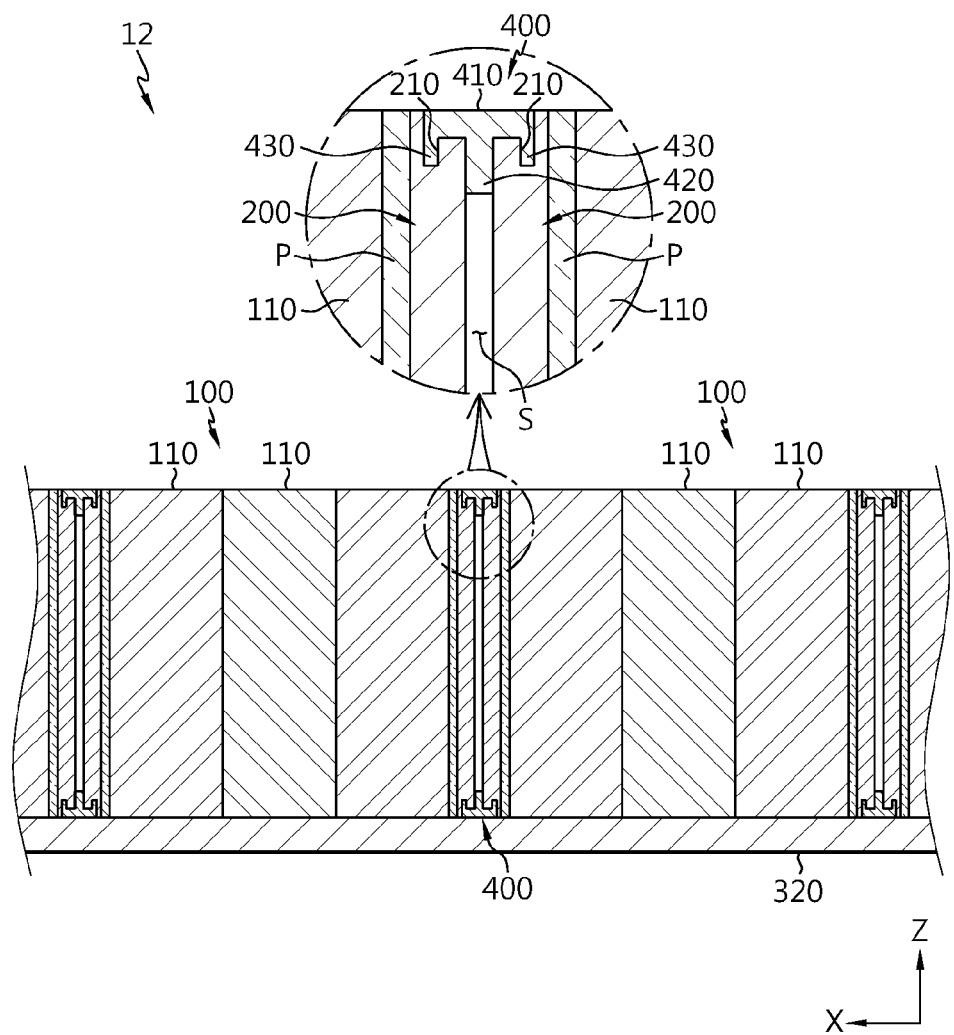
FIGS. 9 and 10 are diagrams showing a battery pack according to the second embodiment of the present disclosure.
Figure 10:
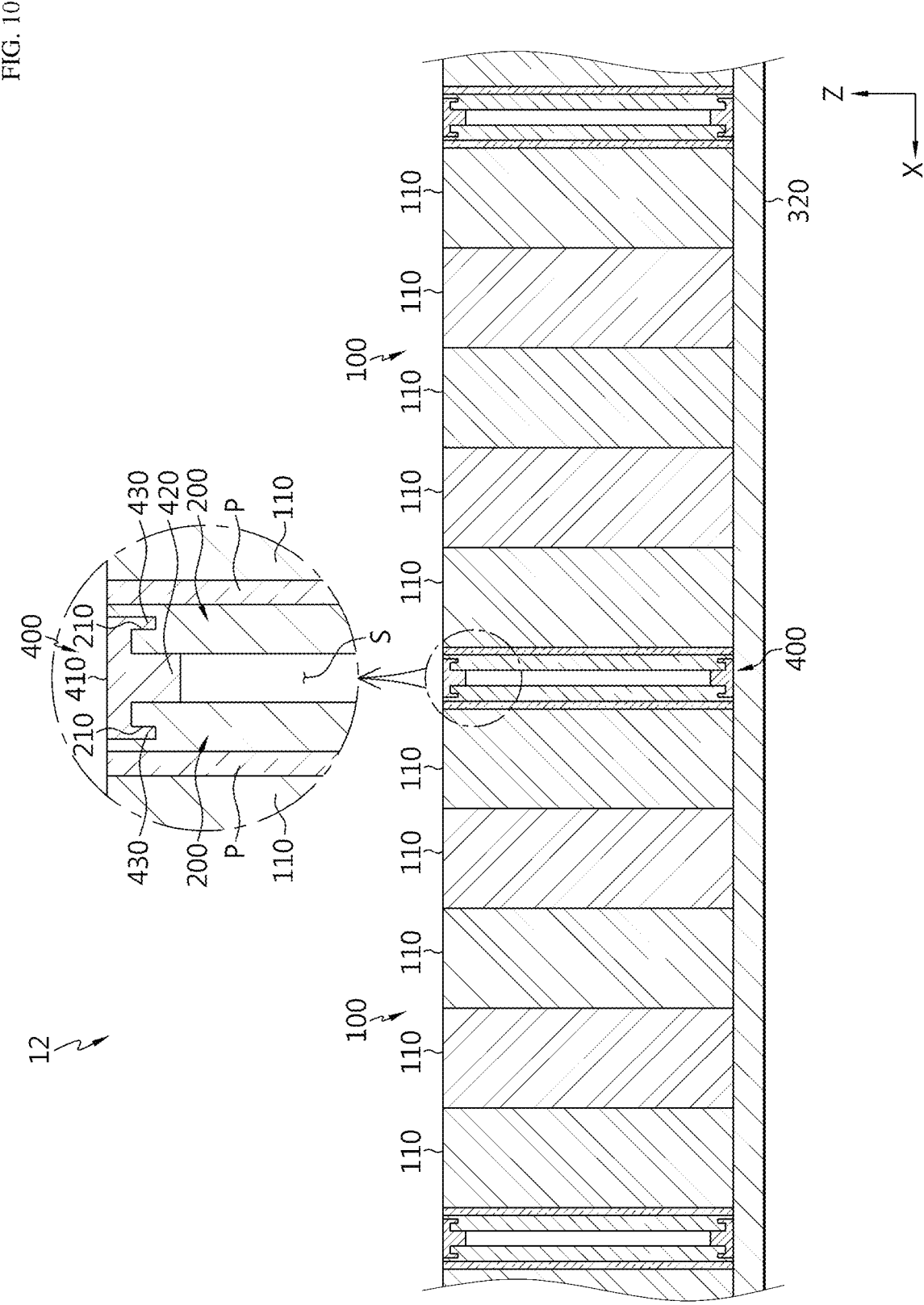

FIGS. 9 and 10 are diagrams showing a battery pack 12 according to the second embodiment of the present disclosure.

Since the battery pack 12 according to this embodiment is similar to the battery pack 10 of the previous embodiment, redundant descriptions of components substantially the same as or similar to those of the previous embodiment will be omitted, and differences from the previous embodiment will be described below.

Referring to FIGS. 9 and 10, in the battery pack 12, the gap S between the support plates 200 supporting adjacent battery cell assemblies 100 may be adjusted in size to correspond to the number of battery cells 110 included in the battery cell assembly 100. That is, in the battery pack 12, the gap S may be adjusted in response to the capacity of the battery cell assembly 100.

Specifically, the gap S between the support plates 200 may be adjusted by changing the width (length in the X-axis direction) of the gap forming portion 420 of the fixing member 400.

For example, as shown in FIG. 9, when one battery cell assembly 100 includes three battery cells 110, the fixing member 400 including the gap forming portion 420 having a width capable of forming a corresponding gap S may be inserted between the support plates 200 that support adjacent battery cell assemblies 100. Meanwhile, as shown in FIG. 10, when one battery cell assembly 100 includes five battery cells 110, the fixing member 400 including the gap forming portion 420 having a width capable of forming a corresponding gap S may be inserted between the support plates 200 that support adjacent battery cell assemblies 100.

That is, in the battery pack 12 according to this embodiment, when the number of battery cells 110 constituting the battery cell assembly 100 is large, the gap S may be configured to be large, and when the number of battery cells 110 is small, the gap S may be configured to be small.

As described above, according to the battery pack 12 according to this embodiment, since the gap S between the support plates 200 can be adjusted according to the capacity of the battery cell assembly 100, there is an advantage in that swelling phenomenon that may occur in the battery cell assembly 100 can be handled more flexibly.

Figure 11:
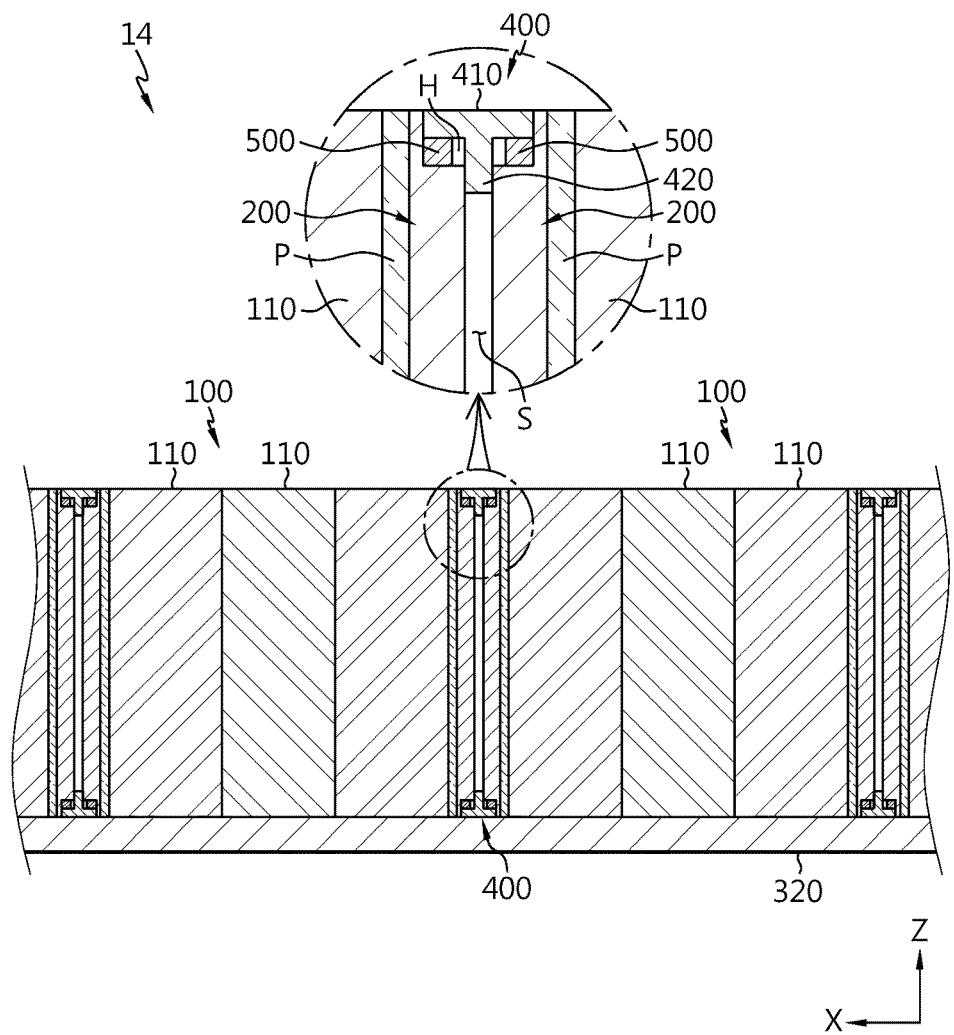
FIGS. 11 and 12 are diagrams showing a battery pack according to the third embodiment of the present disclosure.
Figure 12:
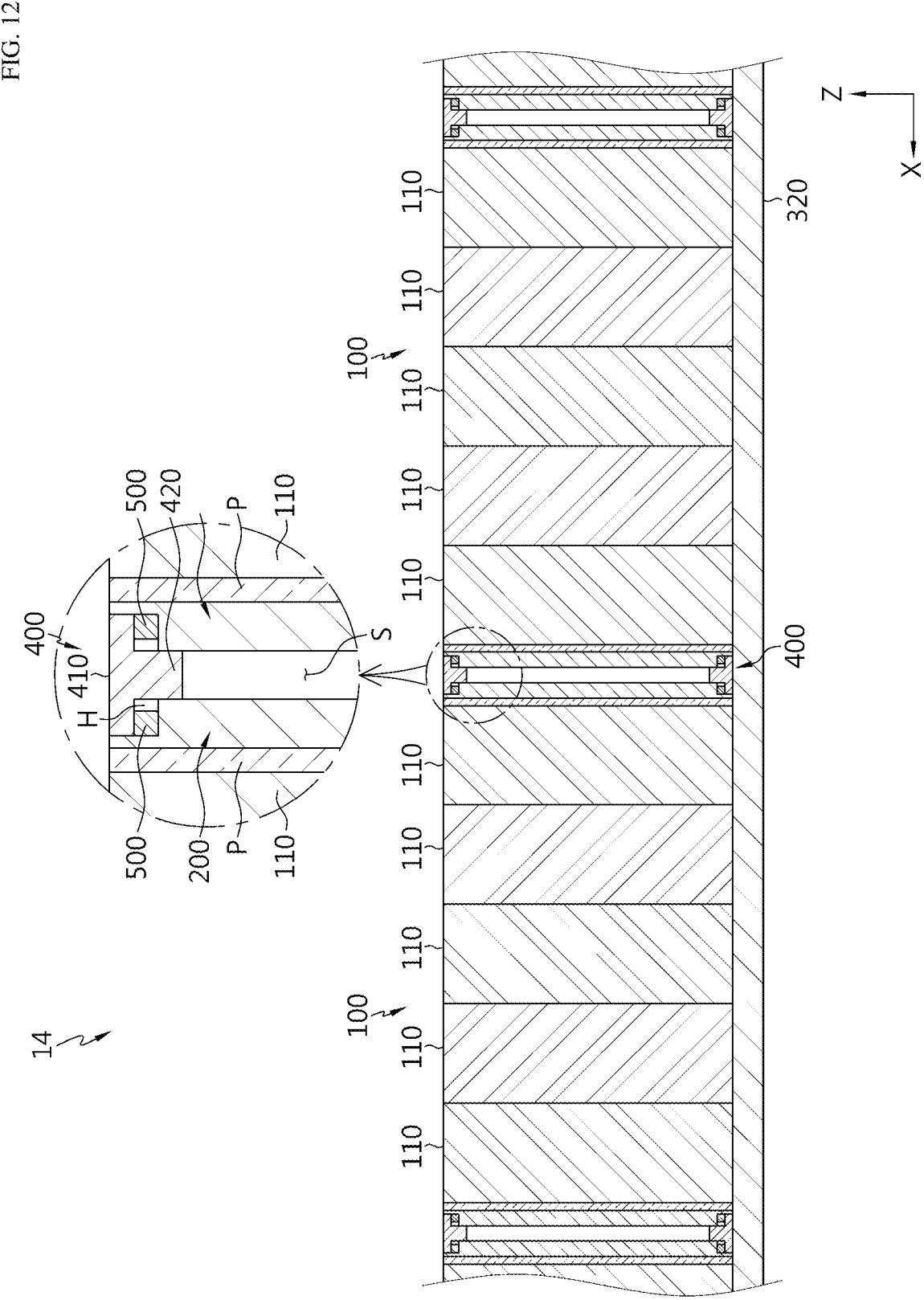

FIGS. 11 and 12 are diagrams showing a battery pack 14 according to the third embodiment of the present disclosure.

Since the battery pack 14 according to this embodiment is similar to the battery pack 12 of the previous embodiment, redundant descriptions of components substantially the same as or similar to those of the previous embodiment will be omitted, and differences from the previous embodiment will be described below.

Referring to FIGS. 11 and 12, the battery pack 14 may further include a guide member 500.

This guide member 500 may be arranged between the mutually adjacent support plates and configured to guide the insertion of the gap forming portion 420 so that the gap forming portion 420 of the fixing member 400 is accurately inserted between the mutually adjacent support plates. In an embodiment, the guide member 500 may include a material with strong rigidity and elasticity.

At approximately the center of the guide member 500, a hole H into which the gap forming portion 420 can be inserted may be formed in the upper and lower directions. At this time, the gap forming portion 420 may pass through the hole H and be inserted between the support plates 200 to form the gap S. Additionally, the guide member 500 may be configured to support the side portion of the fixing member 400 (side portion of the body 410) in the upper and lower directions.

Additionally, both sides of the guide member 500 may be configured to come into close contact with the sides of the support plate 200 when viewed from the stacking direction (X-axis direction) of the plurality of battery cells 110.

Meanwhile, in the battery pack 14, the gap S between the support plates 200 supporting adjacent battery cell assemblies 100 may be configured to be adjusted in size in accordance with the number of battery cells 110 constituting the battery cell assembly 100. That is, in the battery pack 14, the gap S may be adjusted in response to the capacity of the battery cell assembly 100.

Specifically, the gap S between the support plates 200 may be adjusted by changing the width of the gap forming portion 420 of the fixing member 400.

For example, when swelling phenomenon occurs in the battery cell assembly 100, the battery cell assembly 100 may expand in the stacking direction (X-axis direction) of the battery cell 110. In this case, the support plate 200 may be curved in the direction of expansion of the battery cell assembly 100.

As described above, the guide member 500 may be disposed between the support plates supporting two mutually adjacent battery cell assemblies 100 and may be in close contact with the side of the support plates. Therefore, the guide member 500 may absorb the stress (expansion force) transmitted through the support plate 200. That is, the guide member 500 may reduce the stress generated by the swelling phenomenon of the battery cell assembly 100 and transmitted to the fixing member 400. In particular, since the guide member 500 may include a material with strong rigidity and elasticity as described above, it is possible to better absorb the stress generated by the swelling phenomenon of the battery cell assembly 100.

For example, as shown in FIG. 11, when one battery cell assembly 100 includes three battery cells 110, the gap forming portion 420 of the fixing member 400 having a width capable of forming the corresponding gap S may pass through the hole H of the guide member 500 and be inserted between the support plates 200 that support adjacent battery cell assemblies 100.

Meanwhile, as shown in FIG. 12, when one battery cell assembly 100 includes five battery cells 110, the gap forming portion 420 of the fixing member 400 having a width capable of forming the corresponding gap S may pass through the hole H of the guide member 500 and be inserted between the support plates 200 that support adjacent battery cell assemblies 100.

That is, in the battery pack 14 according to this embodiment, when the number of battery cells 110 constituting the battery cell assembly 100 is large, the gap S may be configured to be large, and when the number of battery cells 110 is small, the gap S may be configured to be small.

In addition, in the battery pack 14 according to this embodiment, since the guide member 500 may be disposed between the support plates 200 that support adjacent battery cell assemblies 100, even if the number of battery cells 110 constituting the battery cell assembly 100 increases so that the stress generated by the swelling phenomenon of the battery cell assembly 100 becomes larger, the transfer of this stress to the fixing member 400 can be minimized.

Meanwhile, the hole H of the guide member 500 may be formed to an appropriate size to allow the gap forming portion 420 of various widths to pass through.

As discussed above, according to the battery pack 14 according to this embodiment, it is possible to respond more flexibly to the swelling phenomenon that may occur in the battery cell assembly 100, and it is also possible to prevent the fixing member 400 from being damaged by the swelling phenomenon.

Figure 13:
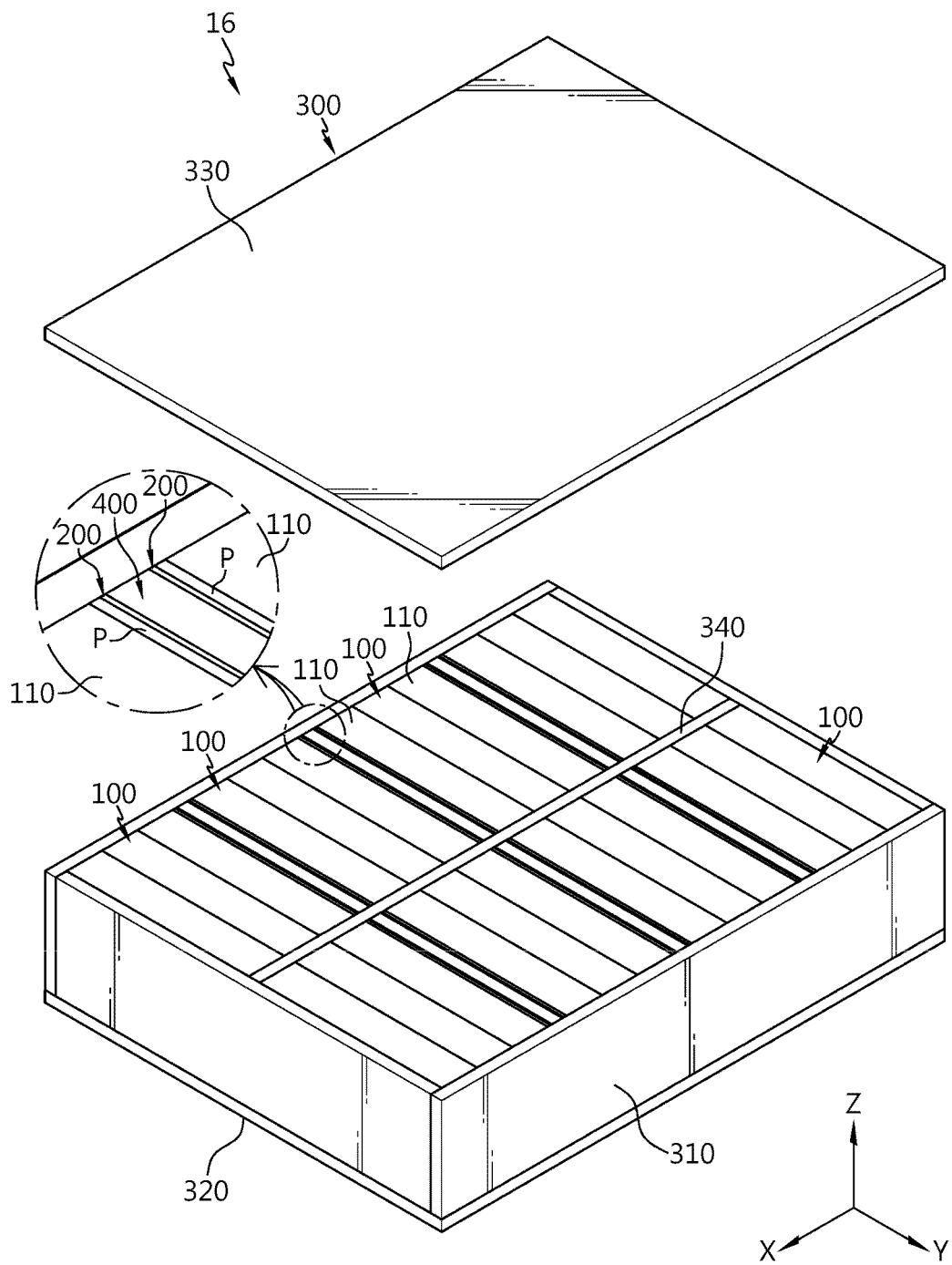
FIG. 13 is a diagram showing a battery pack according to the fourth embodiment of the present disclosure.

FIG. 13 is a diagram showing a battery pack 16 according to the fourth embodiment of the present disclosure.

Since the battery pack 16 according to this embodiment is similar to the battery pack 10 of the previous embodiment, redundant descriptions of components substantially the same as or similar to those of the previous embodiment will be omitted, and differences from the previous embodiment will be described below.

Referring to FIG. 13, in the battery pack 16, the pack housing 300 may further include a reinforcing frame 340.

The reinforcing frame 340 may be configured to reinforce the rigidity of the pack housing 300. At this time, the floor frame 320 may be placed below the reinforcing frame 340. In addition, both ends of the front and rear directions (X-axis direction) of the reinforcing frame 340 may be respectively coupled with the side frames arranged along the left and right directions (Y-axis direction) of the pack housing 300 among the plurality of side frames 310. Also, when viewed from the left and right directions (Y-axis direction) of the pack housing 300, the reinforcing frame 340 may be provided approximately in the center of the pack housing 300.

Additionally, the battery cell assembly 100 and the support plate 200 supporting the same may be placed on both sides of the left and right directions (Y-axis direction) of the pack housing 300 based on the reinforcing frame 340. At this time, in the left and right directions (Y-axis direction) of the pack housing 300, one end of the battery cell assembly 100 and the support plate 200 may be configured to be adjacent to the side frame 310, and the other end may be configured to be adjacent to the reinforcing frame 340.

That is, in the battery pack 16 according to this embodiment, when the length of the left and right directions (Y-axis direction) of the battery cell 110 is approximately half of the length of the left and right directions (Y-axis direction) of the pack housing 300, by placing the reinforcing frame 340 inside the pack housing 300, the battery cell assembly 100 and the support plate 200 can be stably accommodated inside the pack housing 300. In this case, the length of the fixing member 400 extending in the left and right directions (Y-axis direction) of the pack housing 300 may configured to correspond to the length of the battery cell 110 extending in the left and right directions (Y-axis direction).

Meanwhile, a fire extinguishing agent (not shown) may be included in the fixing member 400 according to the present disclosure. For example, the extinguishing material may be a microcapsule in the form of a polymer shell surrounding fluorinated ketone, which is a high-performance extinguishing agent. Also, the extinguishing agent may be configured to discharge the extinguishing agent to the gap S described above by reacting with a temperature range of approximately 120° C. to 220° C.

That is, in the case where a fire extinguishing agent is included in the fixing member 400, when the temperature within the gap S rises to a certain temperature range, the fire extinguishing agent is discharged to the gap S, so thermal runaway propagation and simultaneous ignition between adjacent battery cell assemblies can be suppressed more reliably.

Figure 14:
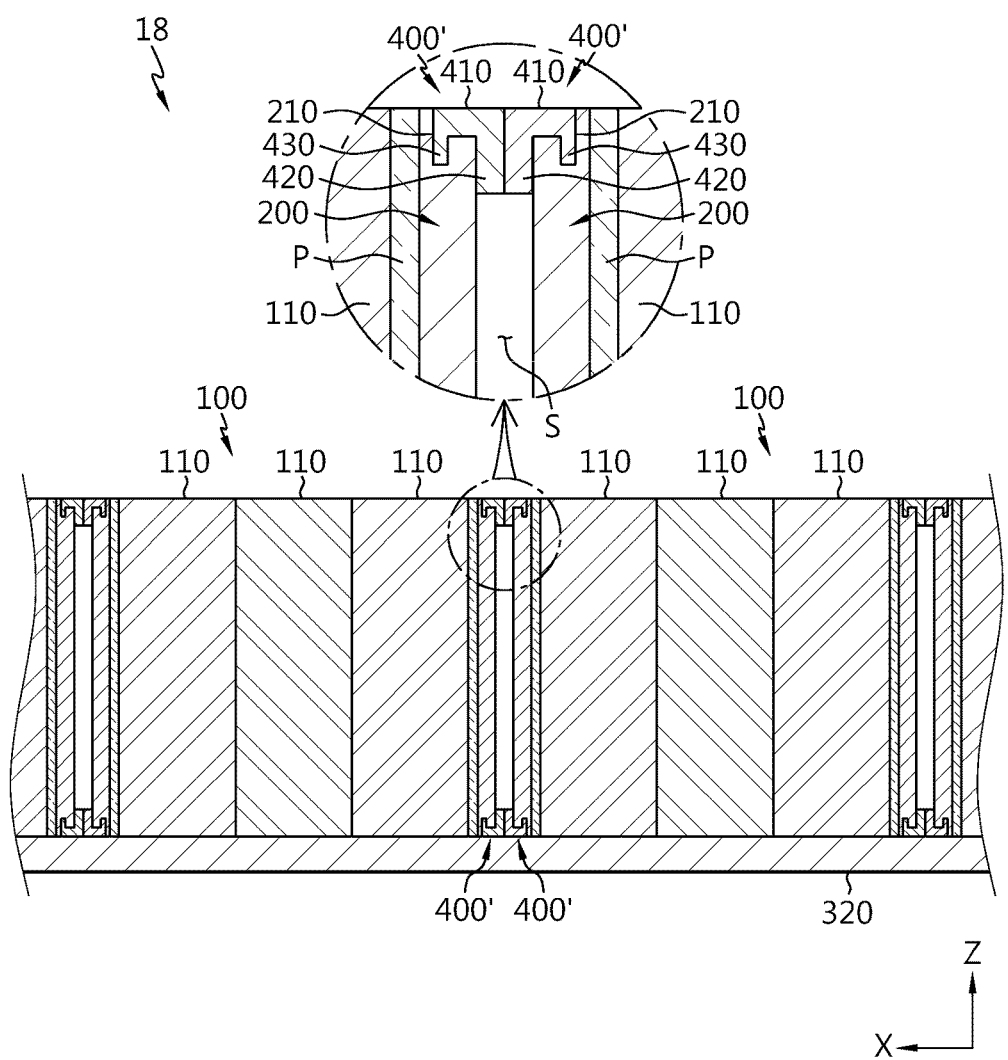
FIG. 14 is a diagram showing a battery pack according to the fifth embodiment of the present disclosure.

FIG. 14 is a diagram showing a battery pack 18 according to the fifth embodiment of the present disclosure.

Since the battery pack 18 according to this embodiment is similar to the battery pack 10, 12 of the previous embodiment, redundant descriptions of components substantially the same as or similar to those of the previous embodiment will be omitted, and differences from the previous embodiment will be described below.

Referring to FIG. 14, the battery pack 18 may include a fixing member 400' of a modified structure that replaces the fixing member 400 described above.

The fixing member 400' fixes the mutually adjacent support plates, among the plurality of support plates 200 supporting the plurality of battery cell assemblies 100, to the pack housing 300, and may fix them to form a gap S between the mutually adjacent support plates.

The gap S formed by this fixing member 400' may serve as a buffer space between the mutually adjacent support plates. Additionally, the fixing member 400' may be configured to extend in the left and right directions (Y-axis direction) of the pack housing 300.

Figure 15:
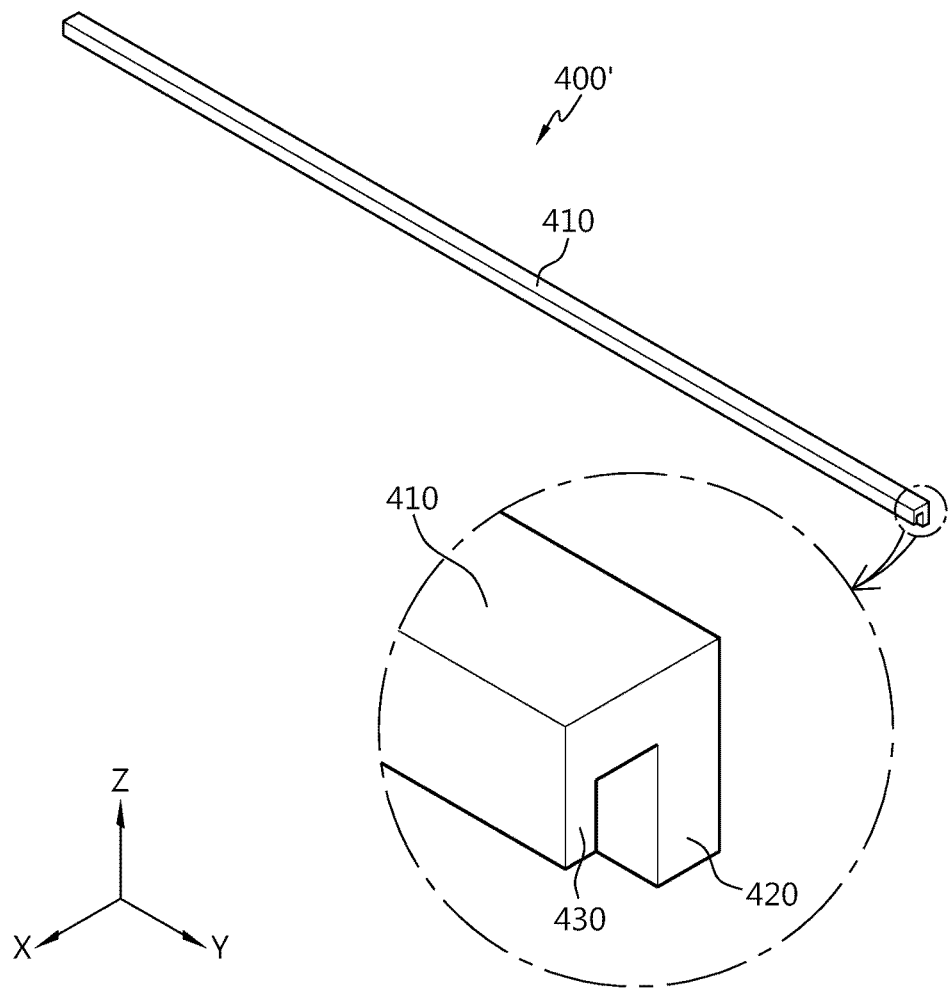
FIG. 15 is a diagram showing the fixing member shown in FIG. 14.

FIG. 15 is a diagram showing the fixing member 400' shown in FIG. 14.

Referring to FIG. 15, the fixing member 400' may include a body 410, a gap forming portion 420, and a side portion 430.

The body 410 may constitute the main body of the fixing member 400'.

As described above, the gap forming portion 420 may be configured to be inserted between mutually adjacent support plates in the upper and lower directions (Z-axis direction) to form the gap S described above.

At this time, the gap forming portion 420 protrudes from one end of the body 410, so the fixing member 400' may have a generally "L-shaped" cross-section. In this case, the gap forming portion 420 may have a predetermined thickness and protrude from one end of the body 410 by a predetermined length.

The side portion 430 may be configured to extend from one side of the gap forming portion 420 toward the support plate 200 adjacent to the fixing member 400' and be inserted into the indented portion 210 of the adjacent support plate 200. In this case, the side portion 430 may be configured to be in close contact with the inner surface of the indented portion 210.

According to this embodiment, the support plate 200 can be easily fixed inside the pack housing 300, and the arrangement structure of the battery cell assemblies disposed inside the pack housing 300 can be diversified.

Figure 16:
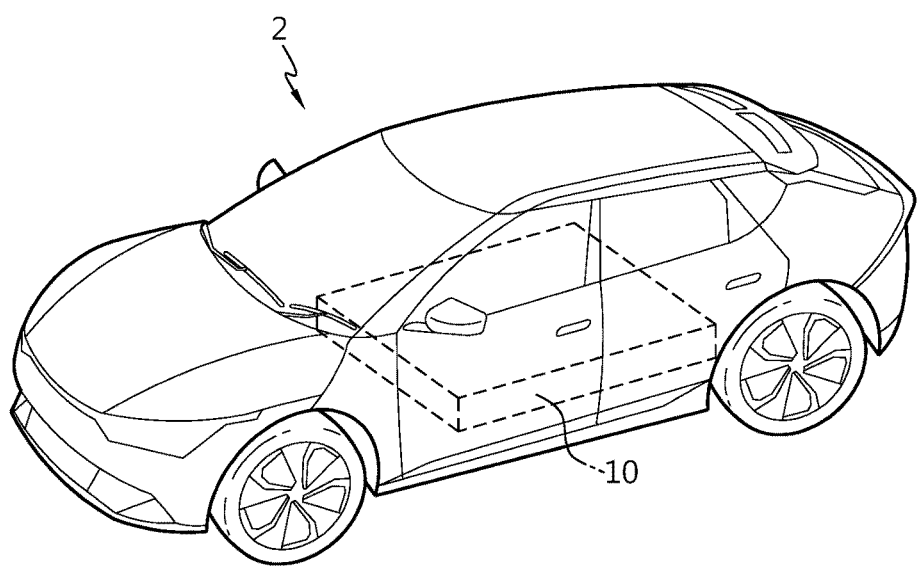
FIG. 16 is a drawing showing a vehicle according to an embodiment of the present disclosure.

FIG. 16 is a drawing showing a vehicle 2 according to an embodiment of the present disclosure.

Referring to FIG. 16, the vehicle 2 according to an embodiment of the present disclosure includes at least one battery pack 10, 12, 14, 16, 18 according to various embodiments described above.

In this way, the battery pack 10, 12, 14, 16, 18 provided in the vehicle 2 may provide electrical energy required for various operations of the vehicle 2.

For reference, the battery pack 10, 12, 14, 16, 18 according to the present disclosure may be applied to various electrical devices or electrical systems other than vehicles, as well as ESS (Energy Storage System).

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

On the other hand, in the present disclosure, terms indicating directions such as up, down, left, right, front, and back are used, but it is obvious to those skilled in the art of the present disclosure that these terms are only for convenience of explanation and they may vary depending on the location of the target object or the location of the observer.

What is claimed is:

1. A battery pack, comprising:
a plurality of battery cell assemblies stacked in a stacking direction;
a pack housing configured to accommodate the plurality of battery cell assemblies therein;
a plurality of support plates configured to support both sides of each battery cell assembly accommodated in the pack housing; and
a first fixing member and a second fixing member configured to fix mutually adjacent support plates among the plurality of support plates to the pack housing so that a gap extending from the first fixing member to the second fixing member is formed between the mutually adjacent support plates,
wherein the first fixing member and the second fixing member each includes a gap forming portion having a predetermined thickness in the stacking direction and configured to be inserted between the mutually adjacent support plates to form the gap, wherein the size of the gap in the stacking direction is configured to correspond to the predetermined thickness in the stacking direction of the gap forming portion, wherein at least one of the mutually adjacent support plates includes an indented portion into which a portion of the first fixing member or the second fixing member is inserted and coupled, and wherein the first fixing member or the second fixing member further includes a side portion configured to extend from one side of the gap forming portion toward the at least one of the mutually adjacent support plates and to be inserted into the indented portion of the at least one of the mutually adjacent support plates.

2. The battery pack according to claim 1, further comprising a guide member disposed between the mutually adjacent support plates and configured to guide insertion of the gap forming portion.

3. The battery pack according to claim 1, wherein at least one of the first fixing member or the second fixing member is integrally formed with the pack housing.

4. The battery pack according to claim 1, wherein the side portion is configured to be in close contact with an inner surface of the indented portion.

5. The battery pack according to claim 1, wherein the side portion of the first fixing member or the second fixing member is one of a pair of side portions configured to extend from both sides of the gap forming portion toward the mutually adjacent support plates with the gap forming portion interposed therebetween, and to be inserted into the indented portions of the mutually adjacent support plates.

6. The battery pack according to claim 1, further comprising a compression pad disposed between each of the battery cell assemblies and the support plate that support a corresponding battery cell assembly among the plurality of support plates.

7. A vehicle, comprising the battery pack according to claim 1.

* * * * *